United States Patent [19]
Goffe

[11] 3,941,473
[45] Mar. 2, 1976

[54] MANUAL ASSIST DOCUMENT FEEDER
[75] Inventor: William L. Goffe, Webster, N.Y.
[73] Assignee: Xerox Corporation, Stamford, Conn.
[22] Filed: Oct. 7, 1974
[21] Appl. No.: 512,783

[52] U.S. Cl. .................................................. 355/75
[51] Int. Cl.[2] ........................................ G03B 27/62
[58] Field of Search ...................... 355/75, 76, 8, 64

[56] References Cited
UNITED STATES PATENTS
2,968,992  1/1961  Billet .................................. 355/64 X
3,494,696  2/1970  Henry et al. ...................... 355/75 X Primary Examiner—Richard A. Wintercorn
Attorney, Agent, or Firm—H. Fleischer; J. J. Ralabate; C. A. Green

[57] ABSTRACT

An apparatus in which the manual placement of successive original documents onto the platen of a reproducing machine is facilitated. A plurality of original documents are located on the platen with the lowermost document being positioned thereon for reproduction. After being reproduced, the lowermost document is removed from the platen while the uppermost document is retained thereon enabling it to be subsequently reproduced.

8 Claims, 2 Drawing Figures

MANUAL ASSIST DOCUMENT FEEDER

The foregoing abstract is neither intended to define the invention disclosed in the specification, nor is it intended to be limiting as to the scope of the invention in any way.

BACKGROUND OF THE INVENTION

This invention relates generally to an electrophotographic printing machine, and more particularly concerns an apparatus for assisting in the manual placement of successive original documents onto the platen thereof.

In the process of electrophotographic printing, for example, as disclosed in U.S. Pat. No. 2,297,691 issued to Carlson in 1942, a photosensitive element having a photoconductive insulating layer is charged to a substantially uniform potential in order to sensitize its surface. The charged photoconductive surface is then exposed to a flowing light image of the original document being reproduced. Exposing the charged photoconductive surface to the light selectively dissipates the charge in the irradiated areas in accordance with the intensity of radiation transmitted thereto. This records an electrostatic latent image of the original document on the photoconductive surface. The electrostatic latent image is developed by bringing a developer mix of carrier granules and toner particles into contact therewith. The toner particles and carrier granules are selected such that the toner particles have the appropriate charge relative to the electrostatic latent image recorded on the photoconductive surface. When the developer mix is brought into contact with the electrostatic latent image, the greater attractive force thereof causes the toner particles to be attracted from the carrier granules to the electrostatic latent image. The developed toner powder image is then transferred to a sheet of support material, such as plain paper, to which it may be permanently affixed by the suitable application of heat thereto.

In electrophotographic printing, the original document is manually placed upon the exposure platen located at the top of the printing machine. Thereafter, the optical system forms a light image of the original document which is projected onto the charged photoconductive surface.

Document copying, particularly for high speed electrophotographic printing machines, requires more rapid handling of the original document being reproduced. Hereinbefore, it is known in the art to attach a document feeder to the electrophotographic printing machine when a large number of discrete documents are to be copied. The document feeder transports the original documents in sequence to the exposure platen, actuates the electrophotographic printing machine to reproduce the original documents, and then advances the original document to an output tray. By way of example, U.S. Pat. No. 3,499,710 issued to Sahley in 1967, describes one such type of document feeder.

The document handling art is well developed and includes numerous commercial products which provide for automatically advancing successive original documents onto the platen of an electrophotographic printing machine and for removing them thereafter. Exemplary of the numerous patents teaching various features of automatic document handling are U.S. Pat. No. 1,894,004, issued to Rose in 1933; U.S. Pat. No. 3,062,110, issued to Shepardson et al. in 1962; U.S. Pat. No. 3,136,207, issued to Flad et al. in 1964; U.S. Pat. No. 3,416,860, issued to Mihojevich et al. in 1968; U.S. Pat. No. 3,506,257, issued to Sackler et al. in 1970; U.S. Pat. No. 3,674,363, issued to Baller et al. in 1972; and U.S. Pat. No. 3,726,589, issued to Difulvio et al. in 1973. Other exemplary patents are discussed in co-pending U.S. application Ser. No. 449,307 filed in 1974.

Although numerous automatic prior art devices have been developed in order to obviate the foregoing types of problems, it is highly desirable to develop a relatively simple, inexpensive device which facilitates manual feeding of original documents onto a platen of an electrophotographic printing machine.

Accordingly, it is a primary object of the present invention to improve the manual placement of original documents on the platen of an electrophotographic printing machine.

SUMMARY OF THE INVENTION

Briefly stated, and in accordance with the present invention, there is provided an apparatus for assisting in the manual placement of successive original documents onto the platen of a reproducing machine.

Pursuant to the features of the present invention, the apparatus includes a housing member and retaining means. The housing member has an open ended compartment arranged to hold a plurality of original documents therein. In the preferred embodiment thereof, the housing member is positioned on the platen with the lowermost original document being located so that it may be reproduced. After being reproduced, the lowermost original document is removed from the housing member. As the lowermost original document is being removed, the retaining means maintains the uppermost original document in the housing member so as to enable the subsequent reproduction thereof.

BRIEF DESCRIPTION OF THE DRAWINGS

Other objects and advantages of the present invention will become apparent upon reading the following detailed description and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
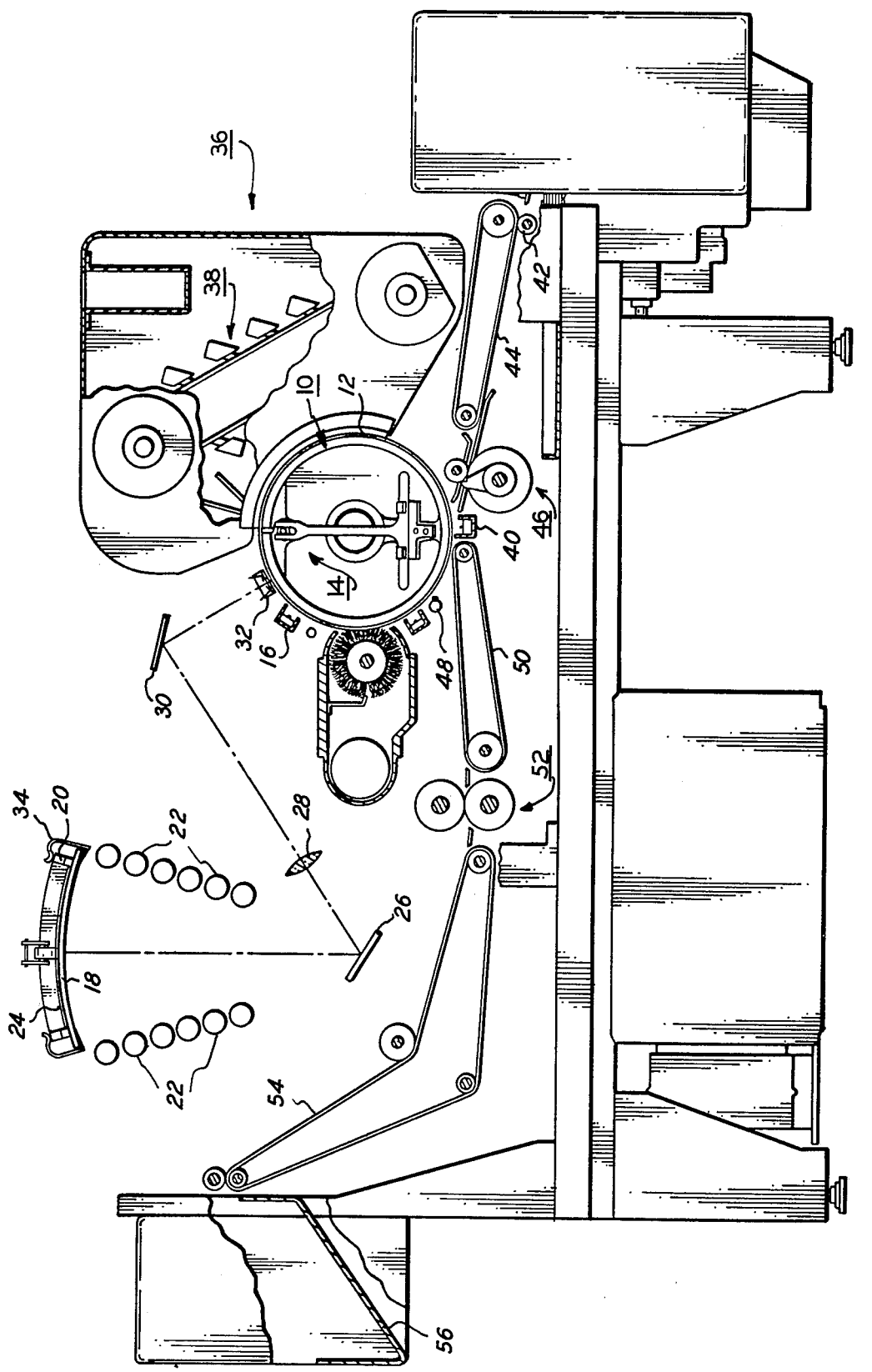
FIG. 1 is a schematic elevational view of an electrophotographic printing machine incorporating the features of the present invention therein.

For a general understanding of an electrophotographic printing machine in which the present invention may be incorporated, reference is had to FIG. 1 which depicts schematically the various system components thereof. Hereinafter, like reference numerals will be employed throughout to designate like elements. Although the apparatus for assisting in the manual placement of successive original documents onto the platen of the electrophotographic printing machine is particularly well adapted for use therein, it should become evident from the following discussion that it is equally well suited for use in a wide variety of devices and is not necessarily limited in its application to the particular embodiment shown herein.

As in all electrophotographic systems of the type illustrated, an image bearing member having a drum 10 with photoconductive surface 12 entrained about and secured to the exterior circumferential surface thereof is rotated, in the direction of arrow 14, through a series of processing stations. These processing stations will be described briefly hereinafter.

Initially, drum 10 rotates photoconductive surface 12 through charging station A. Charging station A employes a corona generating device, indicated generally at 16, to sensitize photoconductive surface 12. Corona generating device 16 is positioned closely adjacent to photoconductive surface 12 so as to charge it to a relatively high substantially uniform potential. For example, corona generating device may be of the type described in U.S. Pat. No. 2,836,725 issued to Vyverberg in 1958.

After being charged, drum 10 rotates photoconductive surface 12 to exposure station B. Exposure station B includes a stationary copy board which comprises a transparent curved platen member 18 such as glass plate or the like, adapted to support an original document placement apparatus, indicated generally by the reference numeral 20, thereon. Original document placement apparatus 20 will be hereinafter described in greater detail with reference to FIG. 2. Briefly, however, placement apparatus 20 positions successive original documents onto platen 18 so as to enable them to be readily reproduced by the electrophotographic printing machine of FIG. 1. After the original document is reproduced, the machine operator manually removes this document, i.e., the lowermost original document in placement apparatus 20 and the next successive original document is positioned above platen 18 enabling it to be reproduced. Lamps 22 illuminate the lowermost original document 24 located in document feeder 20. Scanning of original document 24 is achieved by oscillating mirror 26 in a timed relationship with the movement of drum 10. Mirror 26 is positioned beneath platen 18 and adapted to reflect a light image of the original document through spherical lens 28 onto mirror 30 which, in turn, transmits the light image through an apertured slit 32 onto charged photoconductive surface 12.

Turning once again to placement apparatus 20, latch mechanism 34 is adapted to secure placement apparatus 20 in position on platen 18. As shown in FIG. 1, latch mechanism 34 comprises a pair of L-shaped latches having the lower end region thereof mounted pivotably on platen 18. Placement apparatus 20 is disposed upon platen 20 and latch mechanisms 34 are rotated to the upright position such that the uppermost surface locks placement apparatus 20 on platen 18 in a predetermined location optimum for reproducing the original documents disposed therein. The light image of the original document irradiates charged photoconductive surface 12 to selectively discharge the charge thereon recording an electrostatic latent image corresponding to the original document.

After exposure, drum 10 rotates the electrostatic latent image recorded on photoconductive surface 12 to development station C. Development station C includes a development apparatus 36 comprising a housing having a lower sump for accumulating a developer mix of carrier granules and toner particles. Bucket conveyor 38 is employed to move the developer mix from the lower sump to the upper region thereof, where it is cascaded in a downwardly direction over the electrostatic latent image recorded on photoconductive surface 12. In this manner, the toner particles are attracted electrostatically to the latent image forming a toner powder image on photoconductive surface 12.

With continued reference to FIG. 1, a sheet of support material is advanced by the sheet feeding apparatus to transfer station D. At transfer station D, a corona generating device indicated generally by reference numeral 40, is arranged to spray ions onto the back side of the sheet of support material, which may be a plain sheet of paper or a thermoplastic sheet, to attract the toner powder image from photoconductive surface 12 thereto.

Prior to proceeding with the description of the remaining processing stations disposed about the periphery of drum 10, the sheet feeding apparatus will be briefly described.

As shown in FIG. 1, the sheet feeding apparatus includes vacuum feeders to advance the uppermost sheet of a stack of sheets to roller 42. Roller 42 cooperates with the belts of paper transport 44 for advancing the sheet of support material to sheet registration device 46. Sheet registration device 46 is located adjacent to the drum 10 to arrest and align each successive advancing sheet of support material. Thereafter, sheet registration device 46 advances the sheet of support material into contact with photoconductive surface 12, in a timed relationship with the movement of drum 10. In this way, corona generator 40 attracts the toner particles from photoconductive surface 12 to the sheet of support material forming a toner powder image thereon.

After transfer of the toner powder image to the sheet of support material, stripping apparatus 48 develops a flow of periodically pulsated pressurized air which separates the sheet of support material from photoconductive surface 12. After the sheet of support material is separated from photoconductive surface 12, endless belt conveyor 50 advances it to fusing station E.

At fusing station E, a suitable fusing apparatus 52, generates sufficient heat to permanently affix the toner powder image to the sheet of support material. After the toner powder image is permanently affixed to the sheet of support material, conveyor 54 advances it to a catch tray 56 enabling the machine operator to readily remove the copy from the printing machine.

Continuing now with the various processing stations positioned about the periphery of drum 10, invariably after the sheet of support material is stripped from photoconductive surface 12 some residual toner particles remain adhering thereto. These residual toner particles are removed from photoconductive surface 12 at cleaning station F. Initially, the toner particles are brought under the influence of a corona generating device 58 adapted to neutralize the remaining electrostatic charge on photoconductive surface 12 and the residual toner particles. The neutralized toner particles are cleaned from photoconductive surface 12 by a rotatably mounted fibrous brush 60 in contact therewith.

Subsequent to cleaning, discharge lamp 62 floods photoconductive surface 12 with light to dissipate any residual electrostatic charge remaining thereon prior to the charging thereof for the next successive cycle.

It is believed that the foregoing description is sufficient for purposes of the present application to illustrate the general operation of an electrophotographic printing machine.

Figure 2:
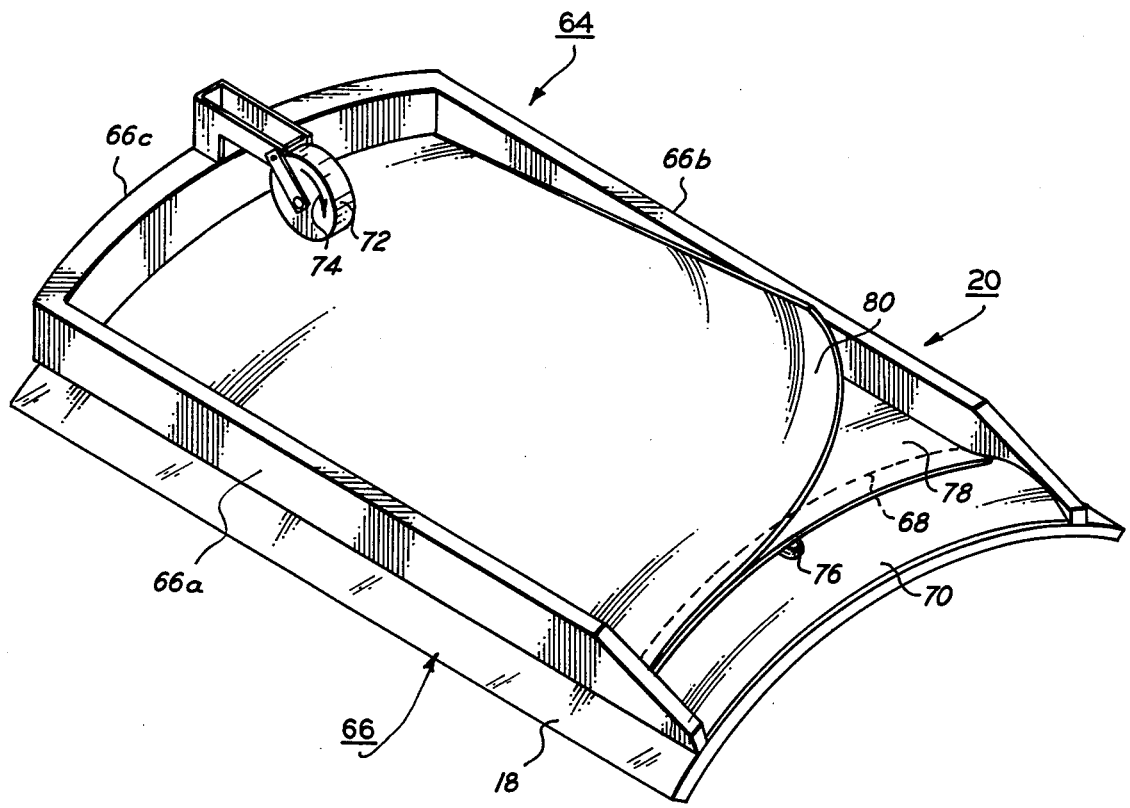
FIG. 2 is a schematic perspective view of the apparatus employed to assist in the placement of successive original documents onto the platen of the FIG. 1 printing machine.

Referring now to the specific subject matter of the present invention, FIG. 2 depicts placement apparatus 20 disposed upon platen 18 of the electrophotographic printing machine depicted in FIG. 1.

Referring now to FIG. 2, placement apparatus 20 includes a housing member, indicated generally by the reference numeral 64. Preferably, housing member 64 includes a U-shaped frame 66. U-shaped frame 66 comprises a pair of spaced side walls 66a and 66b connected to one another via back wall 66c. The walls of frame 66 are adapted to extend in an upwardly direction substantially normal to platen 18 when positioned thereon. The front portion of U-shaped frame 66 is open ended permitting an original document to be removed therefrom. A transparent plate 68 is secured to side wall 66a and side wall 66b. Plate 68 is disposed in the front or open ended portion of U-shaped frame 66 and extends inwardly over the front marginal region thereof. Plate 66 is adjacent to platen 18 having the generally planar surface thereof substantially parallel thereto. Positioned above plate 68 is exit ramp or plate member 70. Plate member 70 is also attached to side walls 66a and 66b in the front marginal region thereof with a portion thereof above plate 68 with the planar surface thereof substantially parallel thereto.

Retaining means or roller 72 is secured to back wall 66c and is journaled so as to be capable of rotating in the direction of arrow 74. A suitable spring or clutch mechanism may be employed to insure that roller 72 may only rotate in the direction of arrow 74. It should be noted that roller 72 is not adapted to be driven in the direction of arrow 74 but rather, is permitted to rotate in that direction when a force is applied to the circumferential surface thereof. By way of example, roller 72 may be made preferably from a suitable elastomeric material, such as natural rubber, synthetic rubber, or mearthane, and have a coefficient of friction preferably ranging from about 2.0 to about 3.0.

Plate member 70 includes aperture 76. Aperture or hole 76 is adapted to indicate when the lowermost original document 78 may be removed from housing member 66. Hole 76 is located over transparent platen 18. In this manner, the operator may see when the exposure lamps have been deactivated after illuminating the original document. At this time, the lowermost original document 78 may be removed from housing 66 and the next successive original document 80 is disposed adjacent to platen 18 so that it may be reproduced.

In operation, two original documents 78 and 80 are placed in housing 66. Both of the original documents are positioned under roller 72. The lowermost original document, i.e. original document 78, is adjacent to platen 18. After the exposure lamps have illuminated original document 78 and are no longer energized, as noted by the machine operator by detecting the light rays transmitted through aperture 76, the uppermost original document 80 is raised manually and the lowermost original document is removed by passing it over plate 70. Roller 72 retains the uppermost original document 80 in housing member 66 inasmuch as it is not free to rotate in this direction. Thus, roller 72 exerts a frictional force on the uppermost original document preventing it from being removed when the operator raises the uppermost original document 80 so as to remove the lowermost original document 78 after the reproduction thereof. After the first original document is reproduced and the next successive original document is in position to be reproduced, the operator manually slides a third original document over the second original document. The third original document is interposed between roller 72 and the second original document. Inasmuch as roller 72 is adapted to rotate in the direction of arrow 74 the third original document may be readily positioned in housing member 66 and no frictional restraint is exerted thereon preventing the positioning thereof. In this manner, placement apparatus 20 provides an assist to rapid manual feeding of original documents so as to increase the speed of reproduction.

From the foregoing, it is, therefore, evident that pursuant to the features of the present invention, as heretofore described, placement apparatus 20 is adapted to provide a manual assist for rapid feeding of original documents into an operative position wherein they may be reproduced on an electrophotographic printing machine. The foregoing is achieved by an open ended housing member defining a compartment for receiving original documents. The original documents are disposed in the housing member manually. Thereafter, the lowermost original document is removed from the platen after the reproduction thereof is indicated. This permits the next successive original document to be in the operative position for the reproduction thereof. The next successive original document is retained in position by a one-way roller frictionally maintaining it on the platen. As the next successive original document is being reproduced, a third document is interposed between the document being reproduced and the roller. The roller is adapted to rotate in a direction such that the third document may be freely inserted above the second document being reproduced. The foregoing cycle is continually repeated providing a manual assist for disposing original documents on the platen of an electrophotographic printing machine increasing the speed of reproduction thereof.

It is, therefore, evident that there has been provided, in accordance with the present invention, an apparatus for manually assisting positioning of original documents on the platen of an electrophotographic printing machine for the reproduction thereof. The apparatus of the present invention fully satisfies the objects, aims and advantages hereinbefore set forth. While this invention has been described in conjunction with specific embodiments thereof, it is evident that many alternatives, modifications and variations will be apparent to those skilled in the art. Accordingly, it is intended to embrace all alternatives, modifications and variations as fall within the spirit and broad scope of the appended claims.

What is claimed is:

1. An apparatus for assisting in the manual placement of successive original documents onto the platen of a reproducing machine, including:
    a housing member having an open ended compartment for holding a plurality of original documents therein, said housing member being positioned on the platen and arranged to locate the lowermost original document in position to be reproduced;

a plate member extending outwardly across the width of the open end of the compartment in said housing member and adapted to facilitate the removal of the lowermost original document therefrom; and a roller mounted in the compartment of said housing member and contacting the uppermost original document therein, said roller being rotatable in one direction to facilitate the insertion of original documents in the compartment of said housing member and being non-rotatable in the opposed direction to frictionally prevent the movement of the uppermost original document during the removal of the lowermost original document from said housing member.

2. An apparatus as recited in claim 1, further including means for indicating that the lowermost original document may be removed from said housing member.

3. An apparatus as recited in claim 2, further including means for releasably securing said housing member on the platen in a predetermined location.

4. An electrophotographic printing machine of the type having a platen for exposing an original document being reproduced therein, including:

a housing member having an open ended compartment for holding a plurality of original documents therein, said housing member being positioned on the platen and arranged to locate the lowermost original document in position to be reproduced;

a plate member for extending outwardly across the width of the open end of the compartment in said housing member and adapted to facilitate the removal of the lowermost original document therefrom; and a roller mounted in the compartment of said housing member and contacting the uppermost original document therein, said roller being rotatable in one direction to facilitate the insertion of original document in the compartment of said housing member and being non-rotatable in the opposed direction to frictionally prevent the movement of the uppermost original document during the removal of the lowermost original document from said housing member.

5. A printing machine as recited in claim 4, further including means for indicating that the lowermost original document may be removed from said housing member.

6. A printing machine as recited in claim 5, further including means for releasably securing said housing member on the platen in a predetermined location.

7. An apparatus for assisting in the manual placement of successive original documents onto the platen of a reproducing machine including:

a housing member having an open ended compartment for holding a plurality of original documents therein, said housing member being positioned on the platen and arranged to locate the lowermost original document in position to be reproduced; and a roller mounted in the compartment of said housing member and contacting the uppermost original document therein, said roller being rotatable in one direction to facilitate the insertion of original documents in the compartment of said housing member and being non-rotatable in the opposed direction to frictionally prevent the movement of the uppermost original document during the removal of the lowermost original document from said housing member.

8. An electrophotographic printing machine of the type having a platen for exposing an original document being reproduced therein, including:

a housing member having an open ended compartment for holding a plurality of original documents therein, said housing member being positioned on the platen and arranged to locate the lowermost document in position to be reproduced; and a roller mounted in the compartment of said housing member and contacting the uppermost original document therein, said roller being rotatable in one direction to facilitate the insertion of original documents in the compartment of said housing member and being non-rotatable in the opposed direction to frictionally prevent the movement of the uppermost original document during the removal of the lowermost original document from said housing member.

* * * * *